J. F. BALKUS.
SOLDERING IRON.
APPLICATION FILED DEC. 17, 1912.
1,061,803.
Patented May 13, 1913.
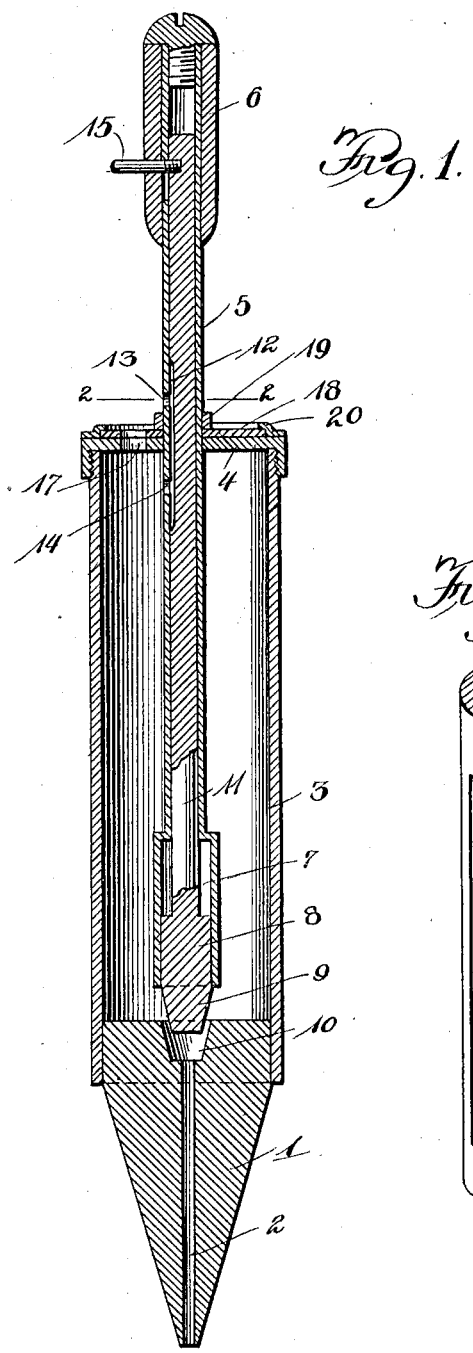
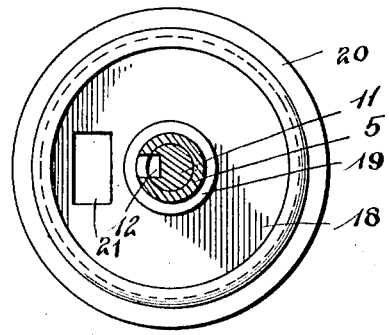
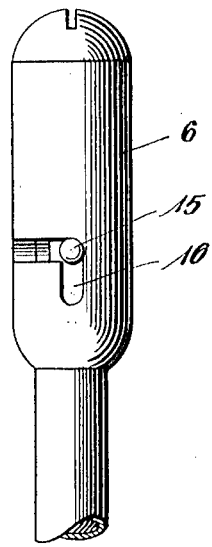
Witnesses
Ernest Crocker
R. M. Smith
Inventor
Joseph F. Balkus
By Victor J. Evans
Attorney

UNITED STATES PATENT OFFICE.

JOSEPH F. BALKUS, OF GLASTONBURY, CONNECTICUT.

SOLDERING-IRON.

1,061,803.    Specification of Letters Patent.    Patented May 13, 1913.

Application filed December 17, 1912. Serial No. 737,301.

*To all whom it may concern:*

Be it known that I, JOSEPH F. BALKUS, a citizen of the United States, residing at Glastonbury, in the county of Hartford and State of Connecticut, have invented new and useful Improvements in Soldering-Irons, of which the following is a specification.

This invention relates to soldering irons, the object in view being to provide, in connection with a soldering point, a magazine for containing the solder, together with means for controlling the feed of the solder to the point of application, and also for controlling the admission of air to the magazine, so as to enable the flow or feed of the solder to be started and stopped with certainty.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a longitudinal section through a soldering iron complete, embodying the present invention. Fig. 2 is a cross section through the same on the line 2—2 of Fig. 1. Fig. 3 is a detail perspective view of the stem. Fig. 4 is an elevation of the handle, showing the valve control.

Referring to the drawings, 1 designates the soldering point which is ordinarily composed of copper, and in carrying out this invention, said soldering point is provided with a duct 2 extending longitudinally through the same and opening out at the extremity of the point, as shown in Fig. 1. Arranged in rear of the soldering point is a magazine 3 of tubular form, one end of which is closed by the head, while the opposite end is closed by means of a cap 4 which may either be permanently or detachably mounted thereon, as by threading. Extending longitudinally within and centrally of the magazine 3 is a combined air tube and handle shank 5 which extends exteriorly of the magazine, as shown, to receive the handle or hand grip 6. At its inner end, the tube 5 is enlarged to form a valve guide 7, in which is mounted a valve 8 having a conical end 9 which is adapted to seat in a correspondingly shaped recess 10 in the inner end of the head 1, which recess 10 is in communication with the duct 2 above referred to. Secured to the valve 8 and extending rearwardly therefrom is a rod or stem 11. This stem extends throughout the entire length of the combined air tube and handle shank 5, and the latter is provided at its rear end with the handle or hand grip 6. The stem 11 is provided with a passage 12, shown in the form of a groove extending along the outside of the stem, said groove, when brought into alinement with inlet and outlet ports 13 and 14 in the tube 5, being adapted to bridge said ports and allow the air to pass into the magazine 3, so as to permit the solder to flow through the duct 2 to the point of the soldering iron.

It will be observed that the cut off valve 8 is carried by the same stem 11 which forms the air valve, enabling both of said valves to be worked simultaneously, by pushing the stem 11 inwardly, and at the same time turning it. This also enables the two valves to be worked independently as the valve may be turned to admit air, without seating or unseating the cut off valve 8 and vice versa.

To provide for closing the cut-off valve 8 and moving the passage 12 into and out of registration with the ports 13 and 14, the stem 11 is provided at its outer end with a laterally projecting operating stud 15 which passes through a bayonet slot 16 in the hand grip 6, and also in the tubular shank 5, as shown in Figs. 1 and 4. By moving the stud 15 along the longitudinal portion of the slot 16, the valve 8 is moved toward and away from its seat. By pushing the said stud 15 along the lateral portion of the slot, the stem 11 is partially revolved, so as to throw the passage 12 into and out of registration with the ports 13 and 14.

To introduce the solder into the magazine 3, the cap 4 is provided with a filling opening 17 which may be covered or uncovered by a disk-shaped shutter 18 mounted to revolve around the tubular hand shank 5 and held in place by a collar 19 surrounding and fitting tightly upon the tubular shank 5, the outer edge of said shutter being held in place by an inturned annular flange 20 on the outer face of the cap 4. The shutter 18 is provided with an opening 21 which is adapted to register with the opening 17 in the cap, as shown in Fig. 1.

The solder contained in the magazine 3 will become melted, when the iron is placed on the fire, and will remain in a molten state as long as the soldering point 1 is hot. By means of the valve mechanism described, the solder may be fed through the duct 2 to the point of the soldering iron in any desired quantity, in accordance with the position of the cut-off valve 8, the flow thereof may be instantly stopped by turning the air valve, so as to prevent air from entering the magazine to displace the solder.

What is claimed is:

1. In a soldering iron, a soldering point provided with a duct therethrough, a magazine extending back from said point, a closure for the rear end of said magazine, a combined tubular handle shank and air pipe extending longitudinally within and also exteriorly of the magazine and provided with air ports, a stem fitted in said tubular handle shank and provided with an air passage adapted to register with said ports, a stud connected with said stem for turning the same to open and close said ports, a valve seat at the inner end of the duct in the head, and a cut off valve for said duct operable by the same device which controls the air valve.

2. In a soldering iron, a soldering point provided with a duct therethrough, a magazine extending back from said point, a closure for the rear end of said magazine, a combined tubular handle shank and air pipe extending longitudinally within and also exteriorly of the magazine and provided with air ports, a stem fitted in said tubular handle shank and provided with an air passage adapted to register with said ports, a stud connected with said stem for turning the same to open and close said ports, a hand grip on the tubular shank having a bayonet slot therein through which said stud passes, a valve seat at the inner end of the duct in the head, and a cut-off valve for said duct operable by the same device which controls the air valve.

In testimony whereof I affix my signature in presence of two witnesses.

JOSEPH F. BALKUS.

Witnesses:
W. F. CHATFIELD,
H. E. OLCOTT.

Copies of this patent may be obtained for five cents each, by addressing the "Commissioner of Patents, Washington, D. C."